No. 836,919. PATENTED NOV. 27, 1906.
H. L. BURBANK & J. W. MANSON.
DRAWING BOARD.
APPLICATION FILED MAY 16, 1906.

2 SHEETS—SHEET 1.

WITNESSES:

INVENTORS.

No. 836,919. PATENTED NOV. 27, 1906.
H. L. BURBANK & J. W. MANSON.
DRAWING BOARD.
APPLICATION FILED MAY 16, 1906.
2 SHEETS—SHEET 2.
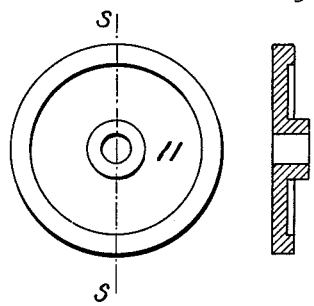
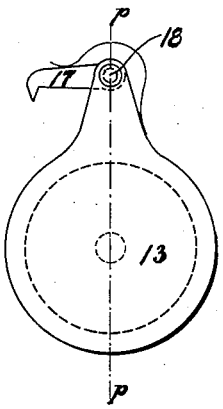
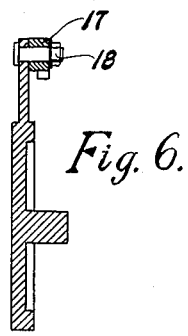
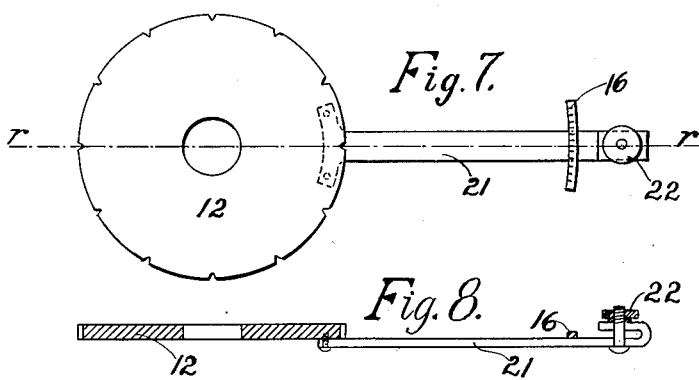
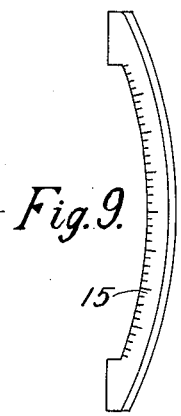
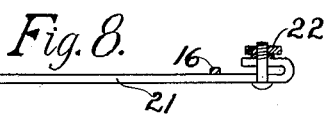
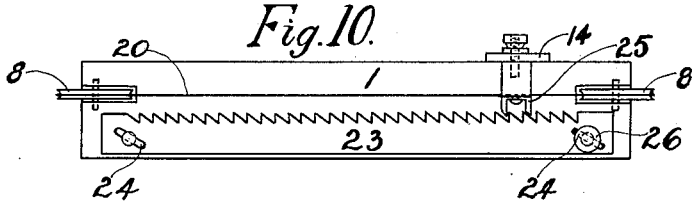
WITNESSES:
INVENTORS.

UNITED STATES PATENT OFFICE.

HENRY L. BURBANK AND JAMES W. MANSON, OF AKRON, OHIO.

DRAWING-BOARD.

No. 836,919.	Specification of Letters Patent.	Patented Nov. 27, 1906.

Application filed May 16, 1906. Serial No. 317,200.

To all whom it may concern:

Be it known that we, HENRY L. BURBANK and JAMES W. MANSON, citizens of the United States of America, residing at Akron, in Summit county and State of Ohio, have invented certain new and useful Improvements in Drawing-Boards, of which the following description, in connection with the accompanying drawings, is a specification, like figures on the drawings representing like parts.

Our invention relates to improvements in drawing-boards, especially to drawing-boards of the rotary type; and the objects of the invention are, first, to provide such a drawing-board with improved and novel devices as can be manipulated by the draftsman with efficiency, celerity, and accuracy in making any class of drawings, and which drawing-board consists, essentially, of a rotary board, an independently-movable member, and pivotal bearing members, which essential elements are so arranged as to provide a mechanism for rotating the board and stopping the rotation quickly and accurately at any desired point, as well as a means for holding the board firmly at any point of stopping; second, to provide a straight-edge or rule peculiarly controlled by means of an adjustable cable and so arranged as to be movable at will in such a manner that the successive positions of the ruling edge are parallel to each other across the rotary board and either with or without relation to a peculiarly-adapted gradatory device, and, third, to provide a drawing-board with improved and novel devices which enable the draftsman to dispense with the use of the T-square, triangle, and protractor as independent instruments and to procure by means of the movable straight-edge, together with our rotatory and gaging devices, the same results as are obtained by use of the aforesaid instruments.

Further objects and advantages of the invention are in reference to the details of structure and use and are hereinafter more particularly described and claimed.

Figure 1:
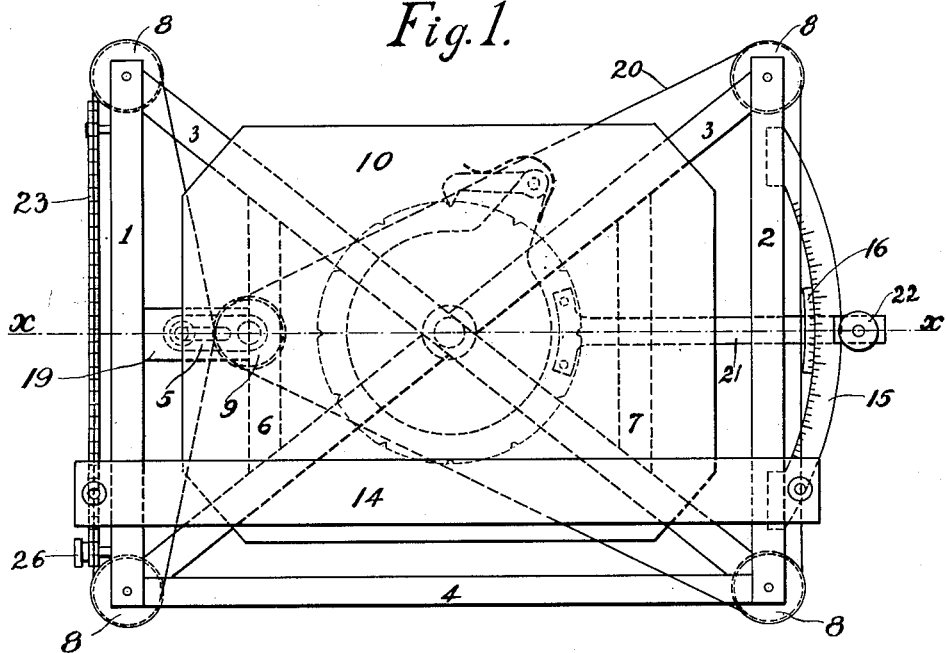
Figure 2:
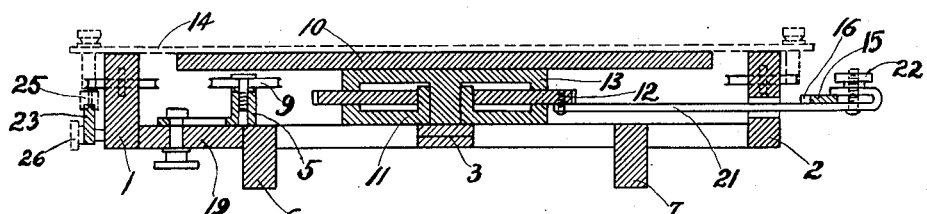

In the drawings forming part of this specification, Figure 1 is a plan view, seen from above, of the drawing-board with parts assembled in preferable arrangement, showing novel features and principles of the invention. Fig. 2 is a vertical cross-section of Fig. 1 on the line $x\ x$. Fig. 3 is a plan view, seen from above, of the lower pivotal member of the rotatory mechanism. Fig. 4 is a vertical cross-section of Fig. 3 on the line $s\ s$. Fig. 5 is a plan view, seen from above, of the top pivotal bearing member of the rotatory mechanism, together with the spring-actuated locking device. Fig. 6 is a vertical cross-section of Fig. 5 on the line $p\ p$. Fig. 7 is a plan view, seen from above, of the independent member with indicator and fastening device. Fig. 8 is a vertical cross-section of Fig. 7 on the line $r\ r$. Fig. 9 is a plan view, seen from above, of a graduated arc to be permanently attached to some portion of the framework and to be used in connection with the indicator on the arm of the movable member. Fig. 10 is a side elevation of a gradatory device which may be used in connection with the movable straight-edge.

Referring now more in detail to the drawings, Fig. 1 shows the preferable working mechanism of our invention.

1 and 2 in Fig. 1 are stationary approximately parallel side pieces whose top surfaces are approximately in the same plane as the upper surface of the rotary board 10, Fig. 1, and may be attached to any suitable base or frame and may be at any desired distance apart.

3 and 3, Fig. 1, are diagonal beams forming part of the framework or base for the rotary mechanism hereinafter described.

4, Fig. 1, is a beam also forming a part of the framework or base aforesaid. This said framework provides a base suitable for placing the novel devices for rotation and stopping and affords suitable stations for the location of the sheaves 8, Fig. 1.

5, Fig. 1, is a slotted bracket resting upon the beam 19 and affording a means for allowing a movement forward and backward of the adjustable sheave 9 and for fastening this movable sheave at any desired point by means of a set-screw or other suitable device, by which movement the tension of the cable is regulated.

6 and 7, Fig. 1, are cross-beams further forming part of the aforesaid framework. 6 also affords a suitable support or fastening-base for the slotted bracket 5 and the beam 19.

8, Fig. 1, represents four guide-sheaves stationed, preferably, at the ends of the side pieces 1 and 2 for the purpose of directing the movement of the cable 20. The sheaves 8 are part of the cable device for producing movement of the straight-edge 14 in such a manner that the successive positions of the ruling edge are parallel to each other 9 is the movably-adjustable sheave by which tension of the cable 20 is regulated by sliding the sheave and the slotted bracket 5 backward or forward as above set forth.

10 is a board or table of any material, size, or shape consistent with the size and construction of the base or the framework above described.

11, Fig. 2, is a flanged thimble forming the base member of the rotatory device and which is suitably attached to the base or framework heretofore described.

12, Fig. 2, is the flanged portion of an independently-movable member used in connection with the base and top members of the rotatory mechanism.

13, Fig. 2, is a flanged bearing member, preferably of some suitable casting metal, attached in some suitable manner to the under side of the board 10. This flanged bearing member 13 forms the top member of the novel rotatory mechanism and is disposed rotatably within the circular opening of the flanged thimble 11 in Fig. 2.

14, Fig. 1, is a movable straight-edge suitably attached to an endless cord or cable 20, so as to move at will in such a manner that the successive positions of the ruling edge are parallel to each other along the side pieces 1 and 2 and across the upper surface of the board 10.

15, Fig. 1 and Fig. 9, is an arc made, preferably, of some metal and with a graduated scale upon its upper face attached to the framework, as shown in Fig. 1, by any suitable means and located at any convenient station.

16, Fig. 1 and Fig. 7, is an indicator made a part of or attached to the arm of the independently-movable member and made of suitable size and adaptability to move easily along the inner periphery of the arc 15.

17, Fig. 5, is a spring-actuated catch or dog, preferably pivoted at some suitable point in the top bearing member 13 by means of a pin 18, Fig. 6.

18, Fig. 5 and Fig. 6, is a pin affording a suitable fulcrum or hinge for the catch or dog 17.

19, Fig. 1, is a short cross bar or beam between 1 and 6, affording a support for the slotted bracket 5.

20 is a flexible endless cable arranged to move about the sheaves 8 and 9 and being attached to the straight-edge 14 affords a means for moving the straight-edge in such a manner that the successive positions of the ruling edge are parallel to each other.

21, Fig. 7, is an arm or lever attached to the flanged portion 12 of the movable member extending beyond the board 10 and attachable to the arc 15.

22, Fig. 1 and Fig. 7, is a set-screw or clamping device for fastening the movable arm 21 to the arc 15.

23, Fig. 10, is a serrated bar attached to the side piece 1 by means of set-screws.

24, Fig. 10, represents diagonal downward-slanting slots in the serrated bar 23.

25, Fig. 10, represents staggered teeth projecting downward from the straight-edge 14.

26, Fig. 10, is one of the set-screws for fastening the serrated bar to the side piece 1.

Heretofore in the making of rotary drawing-boards means have been provided for rotating the board and stopping its rotation at certain well-known and frequently-used degrees of rotation, such as thirty, forty-five, sixty, and ninety degrees.

The movable straight-edge so arranged as to move by means of a cable device in such a manner that the successive positions of the ruling edge are parallel to each other at will across the top of the rotary board has been used heretofore in connection with various styles of drawing-boards. Certain devices for securing the means whereby a series of parallel lines at the interval of equal distances may be made have likewise been in use. The object of our invention is to provide simplified and improved devices for producing these above-mentioned results and in addition thereto to provide means for measuring the degree of rotation of the rotating board and for stopping the rotation of the board at any desired point and for holding the board at such point of stoppage, and, furthermore, in our invention we provide a simple and effective device for regulating the tension of the cable used in connection with the movable straight-edge.

Our novel rotatory, gaging, and stoppage device in its preferable construction consists of a top bearing member, a base bearing member, a movable member with a notched flanged portion and an arm or lever, a catch or dog fastened to the top-bearing member, a graduated arc, an indicator, and a set-screw or clamping device.

The top bearing member 13 is fastened to the under side of the rotary board, and thereby furnishes a pivotal center upon which the board may rotate. Further, the top bearing member affords a base or seat of attachment for the spring-actuated dog or catch 18. This dog or catch is of suitable size and construction to fit snugly into the notches or indentations in the flanged portion 12 of the movable member and is wedge-shaped in design, so as to correspond with the notches with which it interchangeably engages.

The dog or catch is actuated by a spring of sufficient strength as to hold the board firmly at rest when the catch and notch are engaged and yet not so strong as to prevent rotation of the rotary board under stress of suitable force.

The wedge-shaped design of both notch and catch permit of rotation in either direction and to any desired degree of angularity;

but the stoppage device so far described is only effective at the points determined by the location of the notches in the flanged portion of the movable member. Now as the number of notches in the flanged portion 12 of the movable member must of necessity for convenience and accuracy be limited in number and as it becomes necessary to rotate the board to some other degree of angularity in relation to the straight-edge or to some base line, we have provided a means whereby this may be accomplished easily, quickly, and accurately.

Our novel devices for this purpose operate in the following manner: The board is rotated to approximately the position required and there brought to a state of rest by means of the rotatory and stoppage device heretofore particularly explained. Then by means of the arm or lever 21 of the movable member any slight degree of angularity may be either added to that already acquired or be deducted from it by a movement forward or backward of this said arm or lever. The degree of movement of the arm or lever and accordingly the degree of the rotation of the rotary board is measured accurately by means of the graduated arc 15, together with the indicator 16, carried on the arm near to its extremity and moving along the inner periphery of the said arc 15. The base member 11 of this rotatory mechanism is attached to the base or framework before described in some suitable manner, and when so attached it forms a bearing or socket within which the top bearing member 13 is rotatably disposed. The shank of the base bearing member 11 forms a spindle around which the movable member rotates concentrically when moved by the movement of the lever 21 in securing the precise degree of rotation desired in the manner above set forth. The extremity of the arm or lever 21 is fastened by means of a clamping device, so as to hold it firmly in a state of rest, except when it is necessary to move it in gaging the exact degree of rotation desired. As to the matter of the movable straight-edge in connection with our invention our cable device is of simple construction and has a novel device afforded by the movable sheave, whereby the tension of the cable is readily regulated. The cable is so threaded around the five sheaves or pulleys that its movement at the two ends of the attached straight-edge is equal and in the same direction. As it frequently becomes desirable for the draftsman in his work to produce a series of equidistant parallel lines, we have in our invention provided a device whereby this may be accomplished without the necessity of previously marking and measuring distances and without necessitating the use of independent scales or special section-lining instruments. Our device for this purpose is constructed upon the following plan: Upon the outer side of the side piece 1 is attached, by means herein presently described, a serrated bar. This serrated bar has its teeth or projections at equal distances apart and of a size to be compatible with a function, herein presently described, in connection with two teeth or projections extending downward from the under surface of the movable straight-edge. Said serrated bar is attached to the side piece 1 by means of set-screws or other convenient devices in such a manner as to permit of its being raised or lowered in suitably-provided diagonal slots, thus engaging or disengaging it with the teeth or projections of the straight-edge when it is desired to secure or to dispense with its use, respectively, as the draftsman may desire. The teeth or projections on the under side of the straight-edge are staggered with regard to the serrated bar and are of suitable size relatively to the indentations and teeth of the serrated bar as to permit of advancement or retreat in the movement of the straight-edge when assisted and influenced by the slight side movement back and forth of the straight-edge, which side movement of the straight-edge is permitted by the sagging of the adjustable endless flexible cable 20. This slight movement back and forth of the straight-edge combined with such degree of forward or rearward movement as is permitted by the staggered arrangement of the teeth and their relative size in comparison with the indentations and teeth of the serrated bar produce the results which we claim for our novel device as a means for affording the facilities for drawing equidistant parallel lines.

In case it be desired to have the lines at a greater distance apart than the space of the movement afforded by a single combination of the aforesaid movements it is possible to secure such results by combining a series of these joint movements, and thereby obtaining a series of equal distances which are multiples of the space made available by a single combination of movements.

We do not limit ourselves to the preferable construction and arrangement of parts herein described, as the same may be modified in various ways without departing from the spirit of our invention or without sacrificing any of its advantages.

It is evident that the location of the notches on the independently-movable member, as herein set forth, might be on the top pivotal bearing member and the catch or dog might be located on the independently-movable member. Also it is evident that there may be many forms of construction and arrangement of these members which might be employed to obtain the same results as claimed for our invention. It is further evident that the combination of the top bearing member, the base bearing member, and the independently-movable member need not operate as herein described, as the arm might be constructed so as to work with the flanged portion of the independently-movable member by means of gearing or other device and the flanged portion 12 of the movable member might be held in position by suitable guides.

Having described our invention, what we claim as new, and desire to secure by Letters Patent, is—

1. In a rotary drawing-board, an independently-movable member having a flange, an arm projecting from the said flange, and notches at the periphery of the said flange, in combination with the rotating board and supporting-frame of the said rotary drawing-board, a graduated arc mounted on the said supporting-frame beyond the outer edge of the said rotating board, the said graduated arc being a support to which the said projecting arm is attachable at any desired point within the limits of the said arc, and a spring-actuated dog mounted on the under side of the said rotating board and engaging interchangeably with the said notches, substantially as set forth and described.

2. In a rotary drawing-board, an adjustable sheave 9 situated equidistant from the upper and the lower two left-hand sheaves of the four sheaves 8 and attachable to and movable upon the supporting-frame of the said rotary drawing-board, in combination with a supporting-frame, a sheave 8 at each of the four corners of the said supporting-frame, an endless flexible cable supported by and running over the said four sheaves 8 and the said sheaves 9, said cable crossing at the said sheave 9 for adjustment of tension, and a straight-edge attached at its ends to the said cable and movable upon the upper face of the rotating board of the said rotary drawing-board, substantially as set forth and described.

3. In a rotary drawing-board, the combination of a supporting-frame, a rotating board rotatably mounted thereon, a straight-edge movable upon the said rotating board, a flexible cable attached to said straight-edge, sheaves stationed respectively at the four corners of the said supporting-frame and supporting the said flexible cable, a movably-adjustable sheave attachable to and mounted on the said supporting-frame, said flexible cable crossing at the said movably-adjustable sheave, a graduated arc attached to the said supporting-frame, an independently-movable member having a flange and rotatably disposed around the center of rotation of the said rotating board, an arm projecting from the said flange to the said graduated arc, notches at the periphery of the said flange, and a spring-actuated dog rotating with the said rotating board and engaging interchangeably with the said notches, all assembled and operating substantially as set forth and described.

In testimony whereof we have signed our names to this specification in the presence of two subscribing witnesses.

HENRY L. BURBANK.
JAMES W. MANSON.

Witnesses:
M. Z. L. FULLER,
J. ROSS HUFFMAN.